Patented Apr. 12, 1938

2,114,229

UNITED STATES PATENT OFFICE 2,114,229

ABRASIVE ARTICLE AND METHOD OF MANUFACTURING THE SAME

Harry C. Martin and Frederick A. Upper, Niagara Falls, N. Y., assignors, by mesne assignments, to The Carborundum Company, Niagara Falls, N. Y., a corporation of Delaware No Drawing. Application April 11, 1935, Serial No. 15,826

8 Claims. (Cl. 51—278)

This invention relates to improved abrasive articles and a process of manufacturing the same. In particular the invention is concerned with a method of coating abrasive grain with a resin which yields a new intermediate product for use in the manufacture of improved abrasive articles, both bonded articles such as wheels and stones, and coated articles such as sandpaper, flexible disks and belts and the like.

This application is a continuation in part of our copending application Serial No. 718,674 filed April 2, 1934.

Viewed from certain aspects, the invention is in the nature of an improvement on a process which has been widely used and which is disclosed and claimed in a patent to Harry C. Martin No. 1,626,246. In its preferred embodiment the invention makes use of a product prepared according to the method broadly disclosed in the Martin patent, but preferably using a liquid resin as a plasticizer instead of furfural.

According to the original Martin process, which is used in the preliminary steps of the process of the present invention, in preparing a mix suitable for use in the manufacture of bonded abrasive articles such as bonded abrasive disks and wheels, the abrasive grain is first wet with a high boiling resin solvent, such as furfural, and the moistened grain is then mixed with a dry, powdered phenolic condensation product in the so-called "A stage". By suitably proportioning those three constituents of the mixture, a product is obtained which, after suitable mixing and manipulation, consists of abrasive grains coated with a layer of the dry powdered resin and in which there is substantially no loose or unattached bond in the mixture.

Although this process was widely adopted by abrasive manufacturers and in fact, as is well known in the trade, forms the basis of the present resin bonded abrasive industry, there are certain disadvantages in it which are overcome by the method of the present invention.

One of the difficulties experienced with the Martin process as heretofore practiced has been that the mixes must be used within a few hours after they are made because they tend to cake up and set into a hard mass which is useless for the purpose intended. Another defect of the process results from the fact that the resin bond is only loosely attached to the grain and when the mixture is pressed, the bond is, to a considerable extent, forced off the grain and into the interstices between the abrasive grains thereby tending to reduce the porosity of the finished article. The extent to which articles can be compacted for the purpose of increasing their abrading life is also restricted. This limitation of the density is occasioned by the fact that gases are evolved when the articles are heated to cure the bond which causes the articles to bloat when the density is so high that the gases cannot escape freely.

We have developed a method by which these limitations and faults of the methods of the prior art may be overcome. When the method of our invention is carried out, there is no difficulty with mixes becoming sticky or caking into a solid mass and we have been able to make articles of a density heretofore unattainable without bloating.

We have found that if a mixture such as is made by the Martin process, preferably using a liquid resin as the plasticizer, is allowed to stand in an atmosphere controlled as to temperature and humidity, as will be set forth in more detail later, the resinous coatings around the individual abrasive grains undergo a transformation whereby the originally loose powdered resin blends with the plasticizing agent to form firm continuous films enclosing the individual grains, without causing the loose mass to set up into a hard cake. These coated grains may then be cold molded, preferably after being moistened with a small quantity of suitable resin solvent to make them slightly more adhesive, and the formed article may be removed from the mold and cured as has been the practice with the so-called "green" mixes prepared by the Martin or other similar processes.

We have chosen to designate this step of our process as an "aging" process during which the bond "ripens" to form the hard adherent homogeneous films referred to.

While we do not wish to be limited by any explanation we may offer, we believe that the ripening of the bond involves first of all a homogenization of the liquid and solid ingredients of the bond with the simultaneous evaporation of some of the volatile constituents of the bond and possibly a chemical reaction between the bond ingredients. We have found that this homogenization involves primarily three factors; namely, the composition of the mix, temperature and time.

The composition of the mix involves consideration both of the proportion of liquid to dry ingredients and the chemical composition of the liquid ingredients and of the dry resin, the chemical composition of the liquid ingredients apparently being the most important consideration. For example, we have found that mixes plasticized with furfural are much more prone to cake into useless masses than are mixes which are plasticized with liquid resin such as the normally liquid partial reaction product of a phenol and formaldehyde.

The difficulty encountered in ripening the bond is to prevent it from caking, and the prevention of caking appears to involve four factors; namely, the vapor pressure of the moisture in the air which is in contact with the mix, temperature, time and the depth of the mass of the mix during the aging process.

As is well known ordinary air always contains more or less moisture, the proportion varying from day to day and sometimes from hour to hour. This moisture exerts a pressure which is spoken of as the partial pressure of water in the air or as the aqueous vapor pressure of the air.

It is also known that certain salts such as calcium chloride for example, tend to absorb water from the air until the aqueous vapor pressure of the air reaches a certain value which is dependent upon the properties of that particular salt.

We have found that abrasive mixes containing a resin bond have a similar tendency to absorb moisture and that it is this absorption of moisture from the air which causes such mixes to first become sticky and then cake into a hard mass. We have also found, however, that this tendency to absorb moisture can be either eliminated or sufficiently reduced to prevent mixes from caking, provided the water vapor pressure of the atmosphere in contact with such mixes is kept below certain values which we call the "hygroscopic vapor pressure" of the mix.

In other words, for each mix and for any given temperature there is a critical aqueous vapor pressure which, if equalled or exceeded, causes absorption or possibly adsorption of water from the surrounding atmosphere to an extent sufficient to cause the mix to first become gummy and eventually to harden into a solid cake, while if the vapor pressure of water in the air is below this critical value the bond will ripen to form the desired films without caking.

This "hygroscopic vapor pressure" of the mix increases slightly with temperature up to temperatures of about 85–90° F. for mixes containing a liquid phenolic resin plasticizer at which point the effect of temperature appears to become more pronounced requiring a lowering of the aqueous vapor pressure of the air to prevent caking. As previously stated we have found it to be lower for mixes plasticized with furfural and the temperature factor appears to be much more pronounced in "furfural mixes" than it is in "liquid resin mixes". For example, we have found that furfural mixes cake up if the temperature exceeds about 80° F. whereas we have successfully aged liquid resin mixes at temperatures as high as 108° F.

The time required to ripen the bond appears to depend on the other three factors, namely atmospheric vapor pressure, composition and temperature, and to be particularly affected by the temperature employed in the aging process. For example, it requires about two days to ripen an ordinary liquid resin mix at 60° F., whereas if the aging process is carried out around 85° F., the bond is sufficiently ripened after about 15 hours. This is presumably because the solvent power of the plasticizing agent as well as the rate of evaporation of the volatile constituents of the mix normally increase with temperature.

The aging process should be carried out on a mix which is spread out in a layer not too deep, preferably about 1 or 2 inches deep, although it may be piled up somewhat higher, particularly if provision is made to turn the mix over occasionally so that the weight of the piled up mix is not always supported by the same grains because the tendency to become tacky and cake appears first at the bottom of the pile of mix.

If the conditions under which the mix is aged are not suitable for that particular mix, it will be found that upon standing, the mix will first become sticky and tacky at the bottom, and will then start to harden into a solid cake. This tendency appears to progress from the bottom of the mix upward and if a mix is left over night, for example, under ordinary conditions of temperature and humidity, the mix will have completely hardened into a solid mass.

On the other hand, if a mix is allowed to stand in a properly conditioned atmosphere, the individual grains will remain entirely free from each other and there will be neither stickiness nor any caking.

Intermediate between these two extremes there are conditions wherein the mix will become sticky and perhaps cake at the bottom, in the more moderate cases the cake being sufficiently friable so that it can be readily broken up. However, if the mix is stirred or loosened occasionally and particularly if it is turned upside down, the aging process can be carried out under conditions which would otherwise produce unsatisfactory results in the form of a sticky mass or even a hard cake. Furthermore, we have found that the tendency for a mass to become sticky and to cake appears to be more marked during the early stages of the aging process and consequently the later stages of the aging can be carried out under conditions which would be unsuitable for the earlier stages. All these factors are to be taken into consideration in what we may term maintaining the aqueous vapor pressure below the hygroscopic vapor pressure of the mix, which is intended to mean aging under such conditions or performing such operations on the mix that the mix does not set up into a hard cake.

The determination of the point at which the bond is sufficiently ripened is best made by pressing an article from the mix and curing it and the degree of ripening required will correspondingly depend on the density to which the mix is to be pressed. If the bond has not been sufficiently ripened, the article will bloat during the curing step which leads us to believe that the ripening of the bond involves not only the establishment of conditions such that the mix does not absorb moisture, but also the evaporation of certain volatile constituents which are inevitably present in a mix of the character described.

It might be said, therefore, that the ripening process comprises a treatment of a green mix whereby the liquid and the solid constituents of the bond homogenize to form firm, adherent films about the grains while at the same time the volatile constituents of the mix are reduced by evaporation and the moisture content of the bond is kept down by maintaining the aqueous vapor pressure of the air below the hygroscopic vapor pressure of the mix.

While it is impractical to attempt to set down the value of the hygroscopic vapor pressure of all mixes because the value varies with different mixes, we will illustrate the invention with reference to typical mixes in order to give an idea of the order of magnitude of this factor and how it varies with temperature.

Example I

Nine hundred (900) grams of No. 16 grit fused alumina abrasive grain were moistened with thirty-two (32) grams of a liquid phenol-formaldehyde condensation product resin in the so-called "A stage". After mixing to assure a uniform distribution of the liquid over the surface of the grain sixty-eight (68) grams of a dry, powdered, heat hardenable "A stage" phenol-formaldehyde condensation product resin was added to the moistened grain and thoroughly mixed to make a product, as described above, in which substantially all the dry resin was taken up by the grain and which had something of a tacky consistency and was what is commonly described as "wet". This product was then screened, spread out in shallow pans to a depth of about one inch and allowed to stand for 48 hours in a room the atmosphere of which was maintained at 60°±5° Fahrenheit and 50%±5% relative humidity. At the end of this time it was screened again and was ready for use.

In preparing the mixture, it has been found that the apparent wetness will vary with the viscosity and solvent power of the liquid constituent of the mix as well as with the temperature and humidity of the mix room and with the grit size of the abrasive grain. We therefore make minor adjustments of the proportions of plasticizer and dry resin to compensate for these variables, as is commonly done in the art, the proportions being adjusted to give a mix which is somewhat "wet" and in which there is no unattached dry resin. Adjustments of this kind are commonly practiced and are well understood in the art.

Example II

A mix was prepared by moistening 900 grams of No. 16 grit fused alumina with 30 cubic centimeters of furfural and mixing the moistened grain with 100 grams of a pulverized "A stage" phenol-formaldehyde resin. The mix was spread out in a layer about 1½ inches deep and placed in a chamber the temperature of which was maintained at 74° F. and the aqueous vapor pressure of the air in the chamber was reduced to 9 mm. of mercury by inserting in the chamber a dehydrating agent and circulating the air in the chamber with a fan. The mix was removed after 20 hours and was ready for use.

Example III 900 grams of No. 16 grit fused alumina first mixed with 30 grams of a normally liquid phenol-formaldehyde resin and then there was added 70 grams of pulverized A stage phenol-formaldehyde resin. The mix was spread out in a layer 1 inch deep and aged for 15 hours at 85° F., the aqueous vapor pressure of the air in contact with the mix being 16 mm. of mercury, at the end of which time the bond was found to be ripened.

Example IV

A mix of the composition of Example III was aged at 108° F. for 10 hours, the aqueous vapor pressure of the air being 14 mm. of mercury. While there was a tendency for the mix to become gummy at the bottom under these conditions caking was avoided by stirring the mix after two hours and again after five hours aging.

The following general directions based on mixes containing 10% bond and 16 grit abrasive grains will indicate the magnitude of the hygroscopic vapor pressure of mixes and serve as a guide in carrying out the invention:

1. The hygroscopic vapor pressure of a "furfural mix" increases from about 9 mm. of mercury at 60° F. to about 10.5 mm. of mercury at 75° F.

2. The permissible upper limit of temperature of furfural mixes with vapor pressures of 9 mm. of mercury is about 85° F.

3. The hygroscopic vapor pressure of a "liquid resin mix" in which the liquid resin was a phenol-formaldehyde resin increased from about 11 mm. of mercury at 60° F. to about 16 mm. at about 90° F. and then decreases to about 15 mm. at about 108° F.

4. While the upper limit of permissible temperature with such "liquid resin mix" has not been determined because of the difficulty in keeping the aqueous vapor pressure of the air low enough at the higher temperatures, apparently temperatures somewhat above 108° F. could be used provided the aqueous vapor pressure could be kept low enough as by first cooling the air to remove substantially all the moisture and then heating it.

In making a molded article such as an abrasive wheel, the aged mix, preferably but not necessarily moistened with cresol in the proportion of 1 cc. of cresol per 1000 grams of mix, is put into a mold, pressed at upwards of 3000 pounds per square inch and the formed article is removed from the mold and cured by heat in the manner well known in the art. For example, the article may be placed in an oven the temperature of which is initially 70° F., is raised to 375° F. during a period of 24 hours and is maintained at this temperature for 10 hours.

In general, we have found that the pressure required to develop a given combination of properties such as density and grade will increase as the mix is allowed to stand after the bond has ripened. For example, instead of applying 3000 pounds per square inch to a mix that had been aged until the bond had ripened it would be necessary to increase the pressure to perhaps 5000 pounds per square inch if the mix were kept for several days more before it was pressed.

Our invention provides a product which is also useful in the manufacture of coated products such as flexible disks.

Our process is adapted to the usual modifications in composition such as the inclusion of fillers of various kinds. Other types of abrasive grain such as silicon carbide, corundum, and emery may be substituted for the fused alumina of the example, other liquid plasticizers or wetting agents may be used instead of liquid resin, and mixtures of various solvents have been successfully employed. Similarly, although our method is particularly well adapted for use with heat hardenable resins such as phenolic condensation products or certain heat hardenable alkyd resins, it may be applied to permanently fusible resins such as the so-called "Novolaks", or permanently fusible phenolic condensation products, meta styrene, certain thermoplastic alkyd resins and the like, or to mixtures of resins such as, for example, a phenolic liquid resin and a dry alkyd resin or powdered shellac. Other obvious changes in composition and manipulation may be employed within the spirit of our invention as defined in the appended claims.

We claim:

1. The method of making resin coated abrasive grains which comprises preparing a mixture of abrasive grains coated with a pulverized resin and a plasticizing agent therefor and aging the mix at a temperature materially below the melting point of the resin and in an atmosphere having an aqueous vapor pressure not substantially in excess of 16 millimeters of mercury to ripen the bond and cause it to form firm adherent films about the individual granules.

2. The method of making resin coated abrasive grains for use as an intermediate product in the manufacture of abrasive articles which comprises mixing abrasive grains with a powdered fusible resin and a liquid plasticizer so as to coat the grains with the resin and plasticizer and allowing the mix to stand in a relatively thin layer in contact with air having a temperature and an aqueous vapor pressure such that the mix will not cake into a hard mass and for a time sufficient to allow the resin and plasticizer to combine and ripen to form substantially dry films on the grains of such a character that the grain will not cohere into a hard mass at ordinary room temperature under light pressures.

3. The method of making resin coated abrasive grains for use as an intermediate product in the manufacture of abrasive articles which comprises coating abrasive grains with a bond comprising a dry powdered fusible resin and a resin solvent and aging the coated grains at a temperature materially below the melting point of the resin and in an atmosphere of lower aqueous vapor pressure than the hygroscopic vapor pressure of the abrasive mix to ripen the bond and cause it to form firm adherent films about the individual granules.

4. The method of making resin coated abrasive grains for use as an intermediate product in the manufacture of abrasive articles which comprises mixing abrasive grains with a liquid plasticizing agent, adding a dry powdered resin to the moistened grain in proportions to make a distributable mix which is substantially dry to the touch and in which the individual abrasive grains are coated with the resin and the plasticizing agent and aging the mix at a temperature materially below the melting point of the resin and in an atmosphere of lower aqueous vapor pressure than the hygroscopic vapor pressure of the mix to ripen the bond and cause it to form firm adherent films about the individual abrasive granules.

5. The method of making resin coated abrasive grains for use as an intermediate product in the manufacture of abrasive articles which comprises mixing abrasive grains with a liquid resin, adding a dry powdered resin to the moistened grain in proportions to make a distributable mix which is substantially dry to the touch and in which the individual abrasive grains are coated with the resin and the liquid resin and aging the mix at a temperature materially below the melting point of the resin and in an atmosphere of lower aqueous vapor pressure than the hygroscopic vapor pressure of the mix to ripen the bond and cause it to form firm adherent films about the individual abrasive granules.

6. The method of making resin bonded abrasive articles which comprises coating abrasive grains with a bond comprising a dry powdered fusible resin and a resin solvent, aging the coated grains at a temperature materially below the melting point of the resin and in an atmosphere of lower aqueous vapor pressure than the hygroscopic vapor pressure of the abrasive mix to ripen the bond and cause it to form firm adherent films about the individual granules, forming an article from the mixture, and hardening the bond by heating.

7. The method of making resin bonded abrasive articles which comprises coating abrasive grains with a bond comprising a dry powdered heat hardenable resin and a normally liquid resin, aging the coated grains at a temperature materially below the melting point of the resin and in an atmosphere of lower aqueous vapor pressure than the hygroscopic vapor pressure of the abrasive mix to ripen the bond and cause it to form firm adherent films about the individual granules, forming an article from the mixture, and hardening the bond by heating.

8. The method of making coated particles for use in the manufacture of abrasive articles which comprises moistening the surfaces of abrasive grains with a liquid comprising a normally liquid resin, adding a dry powdered heat hardenable resin in a proportion to form a mixture which is substantially free from unattached resin, spreading the coated granules out in layers not substantially greater than one inch in depth, and exposing them to air maintained at a temperature of approximately 60° Fahrenheit and an absolute humidity not substantially greater than 50 grains of moisture per pound of dry air.

HARRY C. MARTIN.
FREDERICK A. UPPER.